ns010205673B2

United States Patent
Zhao et al.

(10) Patent No.: US 10,205,673 B2
(45) Date of Patent: Feb. 12, 2019

(54) DATA CACHING METHOD AND DEVICE, AND STORAGE MEDIUM

(71) Applicant: Sanechips Technology Co., Ltd., Shenzhen, Guangdong (CN)

(72) Inventors: Jiao Zhao, Shenzhen (CN); Mingliang Lai, Shenzhen (CN); Haoxuan Tian, Shenzhen (CN); Yanrui Chang, Shenzhen (CN)

(73) Assignee: Sanechips Technology Co. Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/519,073

(22) PCT Filed: Apr. 28, 2015

(86) PCT No.: PCT/CN2015/077639
§ 371 (c)(1),
(2) Date: Apr. 13, 2017

(87) PCT Pub. No.: WO2016/058355
PCT Pub. Date: Apr. 21, 2016

(65) Prior Publication Data
US 2017/0237677 A1 Aug. 17, 2017

(30) Foreign Application Priority Data
Oct. 14, 2014 (CN) .......................... 2014 1 0542710

(51) Int. Cl.
*G06F 12/08* (2016.01)
*H04L 12/863* (2013.01)
(Continued)

(52) U.S. Cl.
CPC ...... *H04L 47/6245* (2013.01); *G06F 12/0815* (2013.01); *H04L 49/90* (2013.01);
(Continued)

(58) Field of Classification Search
CPC ......... G06F 12/0815; G06F 2212/1008; G06F 2212/154; G06F 2212/608; H04L 49/90; H04L 47/6245
(Continued)

(56) References Cited

U.S. PATENT DOCUMENTS 5,602,994 A 2/1997 Ferron
6,977,930 B1 12/2005 Epps
(Continued)

FOREIGN PATENT DOCUMENTS

CN 1897555 A 1/2007
CN 101222444 A 7/2008
(Continued)

OTHER PUBLICATIONS

International Search Report in international application No. PCT/CN2015/077639, dated Jul. 20, 2015. 2 pgs.
(Continued)

*Primary Examiner* — Hua J Song
(74) *Attorney, Agent, or Firm* — Cooper Legal Group, LLC

(57) ABSTRACT

Disclosed is a data caching method, comprising: according to an input port number of a cell, storing the cell in a corresponding first-in first-out queue; determining that a cell to be dequeued can be dequeued in the current $K^{th}$ cycle, scheduling for the cell to be dequeued to be dequeued, acquiring the actual value of the number of splicing units occupied by the cell to be dequeued, and storing the cell to be dequeued in a register the same number of bits wide as a bus in a cell splicing manner, wherein determining that the cell to be dequeued can be dequeued is conducted in accordance with the fact that a first back pressure count value of the $(K-1)^{th}$ cycle is less than or equal to a first preset threshold value, and the first back pressure count value of
(Continued)

the $(K-1)^{th}$ cycle is obtained in accordance with an estimated value of the number of the splicing units occupied when the previous cell to be dequeued is dequeued, the number of splicing units capable of being transmitted by the bus in each cycle, and a first back pressure count value of the $(K-2)^{th}$ cycle. Also disclosed at the same time are a data caching device and a storage medium.

13 Claims, 4 Drawing Sheets

(51) Int. Cl.
 *G06F 12/0815* (2016.01)
 *H04L 12/861* (2013.01)
(52) U.S. Cl.
 CPC .............. *G06F 2212/1008* (2013.01); *G06F 2212/154* (2013.01); *G06F 2212/608* (2013.01)
(58) Field of Classification Search
 USPC ........................................................ 711/141
 See application file for complete search history.

(56) References Cited

U.S. PATENT DOCUMENTS

| | | |
|---|---|---|
| 6,980,552 B1 | 12/2005 | Belz |
| 7,177,276 B1 | 2/2007 | Epps |
| 2002/0012340 A1 | 1/2002 | Kalkunte |
| 2002/0012341 A1 | 1/2002 | Battle |
| 2002/0027908 A1 | 3/2002 | Kalkunte |
| 2002/0136211 A1 | 9/2002 | Battle |
| 2003/0118016 A1 | 6/2003 | Kalkunte |
| 2004/0218592 A1 | 11/2004 | Nagar |
| 2006/0039374 A1 | 2/2006 | Belz |
| 2006/0050690 A1 | 3/2006 | Epps |
| 2006/0182112 A1 | 8/2006 | Battle |
| 2009/0196303 A1 | 8/2009 | Battle |
| 2010/0220589 A1 | 9/2010 | Zheng |
| 2012/0314707 A1 | 12/2012 | Epps |

FOREIGN PATENT DOCUMENTS

| | | |
|---|---|---|
| CN | 101605100 A | 12/2009 |
| CN | 101770356 A | 7/2010 |
| CN | 101964751 A | 2/2011 |
| CN | 102065014 A | 5/2011 |
| JP | H05183528 A | 7/1993 |
| JP | 2000226477 A | 8/2000 |
| JP | 2003018186 A | 1/2003 |
| JP | 2003258899 A | 9/2003 |
| JP | 2006253790 A | 9/2006 |
| JP | 2006324861 A | 11/2006 |
| JP | 2011521313 A | 7/2011 |
| WO | 2009124164 A1 | 10/2009 |
| WO | 2012162949 A1 | 12/2012 |

OTHER PUBLICATIONS

English Translation of the Written Opinion of the International Search Authority in international application No. PCT/CN2015/077639, dated Jul. 20, 2015, 6 pgs.

Supplementary European Search Report in European application No. 15850914.1, dated Sep. 1, 2017, 6 pgs.

"Chapter 2: Legacy Digital Networks", Apr. 12, 2014, Giovanni Giambene, In: "Queuing Theory and Telecommunications Networks and Applications—Chapter 2: Legacy Digital Networks", 68 pgs.

DATA CACHING METHOD AND DEVICE, AND STORAGE MEDIUM

TECHNICAL FIELD

The present disclosure generally relates to the field of data communication techniques, and more particularly to a data caching method, device, and storage medium in a packet switched network.

BACKGROUND

In the field of data communication, as regards to a switched network element chip in a packet switched network, efficiency and scale of a data cache space and a width of a data bus are critical to performance, area and power consumption of the chip. In order to save bus resources and cache resources within the chip and improve switching efficiency, a data packet may generally be divided into a certain number of cells. Then the cells may be transferred to the switched network element chip to be switched and replicated, and the cells may be recombined into the data packet. The cells, subjected to auto addressing and query and input/output buffering, may enter into an output port via an input port to achieve forwarding and replication functions. FIG. 1 is a schematic diagram of a large-scale switched network data process. As a minimum unit for transferring and switching, a cell may be of a fixed-length type or a variable-length type. Compared to the fixed-length cell, the variable-length cell may have a higher utilization of the cache resources and bus resources. Thus, it is the variable-length cell that is generally employed.

A cell cache in the switched network element chip is mainly used to store cell data during a process of the cell waiting for a result of the auto addressing and a process of scheduling outputting. When there is no traffic pressure within the network, a small cache space may be needed. When congestion occurs within the network, serial data packets on an optical fibre with a length up to 100 meters, may have to be cached. The cache space is calculated based on a switching capacity of the switched network element chip so as to avoid that large-scale packet loss occurs in case of the congestion within the network. Currently, in order to cache the cell, a storage space with redundancy may be calculated based on the number of links, the length of the optical fibre, and the data transmission rate. However, with improvement of the scale of the switched network and the data rate, the cache space resources should be increased correspondingly. For example, when the data rate is increased from 12.5 G to 25 G, the capacity of the cache resources should be doubled to guarantee that there is no forwarding loss. Furthermore, in the case of the variable-length cell switching, the utilization of the cache resources may be relatively low. Specially, the utilization of the cache resources is less than 50% in case of smallest cell storage. FIG. 2 is a schematic diagram of utilization for network element storage spaces of various lengths.

In view of the above, it is urgent to provide a data caching method and device, applied in the packet switched network, to improve the utilization of the cache resources and the bus resources.

SUMMARY

In view of this, in embodiments of the present disclosure, it is desired to provide a data caching method, device and storage medium, so as to effectively improve utilization of cache resources and bus resources.

In order to achieve the above object, the technical solutions of the embodiment of the disclosure are implemented as follows.

An embodiment of the disclosure provides a data caching method, including the following steps: cells are stored, to a corresponding First-In-First-Out (FIFO) queue based on an input port number of the cells; in a current Kth cycle, a cell waiting for dequeue is scheduled to be dequeued, when it is determined that the cell waiting for dequeue can be dequeued; an actual value of a number of concatenation units occupied by the cell waiting for dequeue is acquired; and the cell waiting for dequeue is stored into a register with a bit width same as a bit width of a bus through cell concatenation; where it is determined that the cell waiting for dequeue can be dequeued when a first back pressure count value in a (K−1)th cycle is less than or equal to a first preset threshold, and the first back pressure count value in the (K−1)th cycle is calculated based on an estimate value of a number of concatenation units occupied by a previous dequeued cell, a number of concatenation units transmittable by the bus per cycle, and the first back pressure count value in a (K−2)th cycle, the K is a positive integer.

According to an embodiment, before storing the cells, based on the input port number of the cells, to the FIFO queue, the method may further include the following steps: a cell length and a cell version carried in each of the cells are extracted; and a number of cache units occupied by the cell is acquired based on the cell length and the cell version.

According to an embodiment, the storing the cells, based on the input port number of the cells, to the FIFO queue may include the following steps: a tail pointer, an enqueue sub-pointer and a free address of the FIFO queue corresponding to input port number of each of the cells, are acquired based on the input port number; the cell is stored into the FIFO queue, in a length of a number of cache units occupied by each address; valid cache units occupied by the cell are read; the enqueue sub-pointer of the FIFO queue is updated and the free address is released, when the valid cache units do not occupy the free address; and the tail pointer and the enqueue sub-pointer of the FIFO queue are updated, when the valid cache units occupies the free address.

According to an embodiment, after scheduling the cell waiting for dequeue to be dequeued, the method may further include the following step: the first back pressure count value is corrected based on the actual value of the number of the concatenation units occupied by the cell waiting for dequeue and the number of the cache units occupied by the cells waiting for dequeue.

According to an embodiment, the storing the cell waiting for dequeue through the cell concatenation into the register with the bit width as same as the bit width of the bus may further include the following steps: a write pointer is looked for; the cell is stored into a register corresponding to the write pointer, based on the actual number of the concatenation units occupied by the cell waiting for dequeue; when the register contains one or more valid cells, the cell waiting for dequeue is concatenated with the one or more valid cells into concatenation units; and cell concatenation information is recorded, and the write pointer is updated.

An embodiment of the disclosure provides a data caching device, including a caching module and a processing module. The caching module is arranged to store cells, based on an input port number of the cells, to a corresponding First-In-First-Out (FIFO) queue. The processing module is arranged to: in a current Kth cycle, schedule a cell waiting for dequeue to be dequeued, when it is determined that the cell waiting for dequeue can be dequeued; acquire an actual value of a number of concatenation units occupied by the cell waiting for dequeue; and store the cell waiting for dequeue, through cell concatenation, into a register with a bit width same as a bit width of a bus; where it is determined that the cell waiting for dequeue can be dequeued when a first back pressure count value in a (K−1)th cycle is less than or equal to a first preset threshold, and the first back pressure count value in the (K−1)th cycle is calculated based on an estimate value of a number of concatenation units occupied by a previous dequeued cell, a number of the concatenation units transmittable by the bus per cycle, and the first back pressure count value in a (K−2)th cycle, the K is an positive integer.

According to an embodiment, the device may further include an acquisition module. The acquisition module is arranged to extract a cell length and a cell version carried in each of the cells; and acquire a number of cache units occupied by the cell based on the cell length and the cell version.

According to an embodiment, the device may further include a correction module. The correction module is arranged to correct the first back pressure count value based on the actual number of the concatenation units occupied by the cell waiting for dequeue and the number of the cache unit occupied by the cells waiting for dequeue.

An embodiment of the disclosure provides a data caching method, including the following steps: data formed through cell concatenation is de-concatenated into separate cells; the cells are stored to a corresponding First-In-First-Out (FIFO) queue, based on an output port number of the cells; and in a current Kth cycle, a cell waiting for dequeue is scheduled to be dequeued, when it is determined that the cell waiting for dequeue can be dequeued, where it is determined that the cell waiting for dequeue can be dequeued when a second back pressure count value in a (K−1)th cycle is less than or equal to a second preset threshold, and the second back pressure count value in the (K−1)th cycle is calculated based on an estimate value of a number of concatenation units occupied by a previous dequeued cell, a number of the concatenation units transmittable by the bus per cycle, and the second back pressure count value in a (K−2)th cycle, the K is an positive integer.

According to an embodiment, the de-concatenating data formed through cell concatenation into separate cells, may further include the following step: the data formed through cell concatenation is de-concatenated into separate cells based on cell concatenation information carried in the data.

An embodiment of the disclosure further provides a data caching device, including a de-concatenation module, a storage module and a scheduling module. The de-concatenation module is arranged to de-concatenate data formed through cell concatenation into separate cells. The storage module is arranged to store the cells, based on an output port number of the cells, to a corresponding First-In-First-Out (FIFO) queue. The scheduling module is arranged to in a current Kth cycle, schedule a cell waiting for dequeue to be dequeued, when it is determined that the cell waiting for dequeue can be dequeued. It is determined that the cell waiting for dequeue can be dequeued when a second back pressure count value in a (K−1)th cycle is less than or equal to a second preset threshold, and the second back pressure count value in the (K−1)th cycle is calculated based on an estimate value of a number of concatenation units occupied by a previous dequeued cell, a number of the concatenation units transmittable by the bus per cycle, and the second back pressure count value in a (K−2)th cycle, the K is an positive integer.

An embodiment of the disclosure further provides a computer storage medium storing computer-executable instructions for performing the data caching method according to any one of the embodiments.

According to the data caching method, device and storage medium provided by the embodiments of the disclosure, cells are stored to a corresponding FIFO queue, based on an input port number of the cells. In a current Kth cycle, a cell waiting for dequeue is scheduled to be dequeued, when it is determined that the cell waiting for dequeue can be dequeued. An actual value of a number of concatenation units occupied by the cell waiting for dequeue is acquired. The cell waiting for dequeue is stored, through cell concatenation, into a register with a bit width same as a bit width of a bus. It is determined that the cell waiting for dequeue can be dequeued when a first back pressure count value in a (K−1)th cycle is less than or equal to a first preset threshold, and the first back pressure count value in the (K−1)th cycle is calculated based on an estimate value of a number of concatenation units occupied by a previous dequeued cell, a number of concatenation units transmittable by the bus per cycle, and the first back pressure count value in a (K−2)th cycle. In this way, the cell is stored into the register with the width as same as the bit width of the bus through the cell concatenation, and thus the utilization of the bus can be improved. Furthermore, the cell switching efficiency and accuracy of the switched network element chip may be guaranteed through an active back pressure process before a cell is dequeued.

DETAILED DESCRIPTION

According to an embodiment of the disclosure, cells are stored to a corresponding First-In-First-Out (FIFO) queue based on an input port number of the cells. In a current Kth cycle, a cell waiting for dequeue is scheduled to be dequeued, when it is determined that the cell waiting for dequeue can be dequeued. An actual number of concatenation units occupied by the cell waiting for dequeue is acquired. The cell waiting for dequeue, is stored into a register with a bit width same as a bit width of a bus, through cell concatenation. It is determined that the cell waiting for dequeue can be dequeued when a first back pressure count value in a (K−1) cycle is less than or equal to a first preset threshold, and the first back pressure count value in the (K−1)th cycle is calculated based on an estimate value of a number of concatenation units occupied by a previous dequeued cell, a number of the concatenation units transmittable by the bus per cycle, and the first back pressure count value in a (K−2)th cycle, the K is an positive integer.

Figure 1:
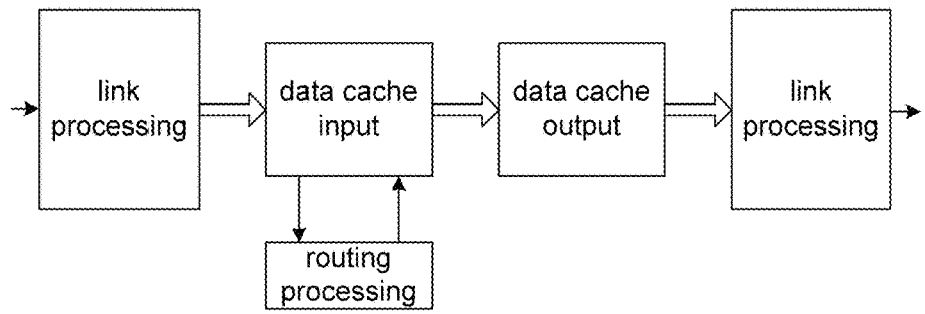
FIG. 1 is a schematic diagram of data processing of a large-scale switched network.
Figure 2:
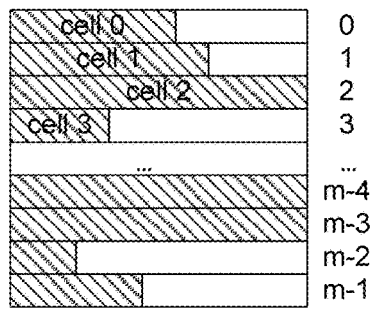
FIG. 2 is a schematic diagram of utilization of network element storage spaces of various lengths.
Figure 3:
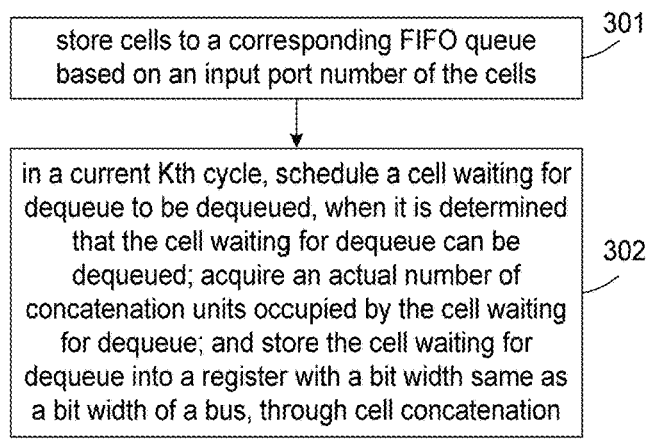
FIG. 3 is a schematic diagram of a data caching method according to a first embodiment of the disclosure.

FIG. 3 is a schematic diagram of a data caching method according to a first embodiment of the disclosure. As shown in FIG. 3, at an cell cache input, the data caching method of the embodiment includes the following steps.

In step 301, cells are stored to a corresponding FIFO queue based on an input port number of the cells.

Before the step 301, the method may further include the following steps: a cell length and a cell version carried in each of the cells are extracted; and a number of cache units occupied by the cell are acquired based on the cell length and the cell version.

Herein, each of the cache units has a size that is one Nth of a size of a Random Access Memory (RAM) corresponding to each address. That is, the RAM is divided into N parts of a same size. Each of the parts is one cache unit, N is a positive integer and N may be set depending on, for example, a data forwarding rate.

In additional to the step of storing, based on the input port number of the cells, the cells to the corresponding FIFO queue, the method may further include: cell information of the cells is stored into the corresponding FIFO queue. The cell information of each of the cells may include a length of the cell, a version of the cell and the number of cache units occupied by the cell.

Figure 4:
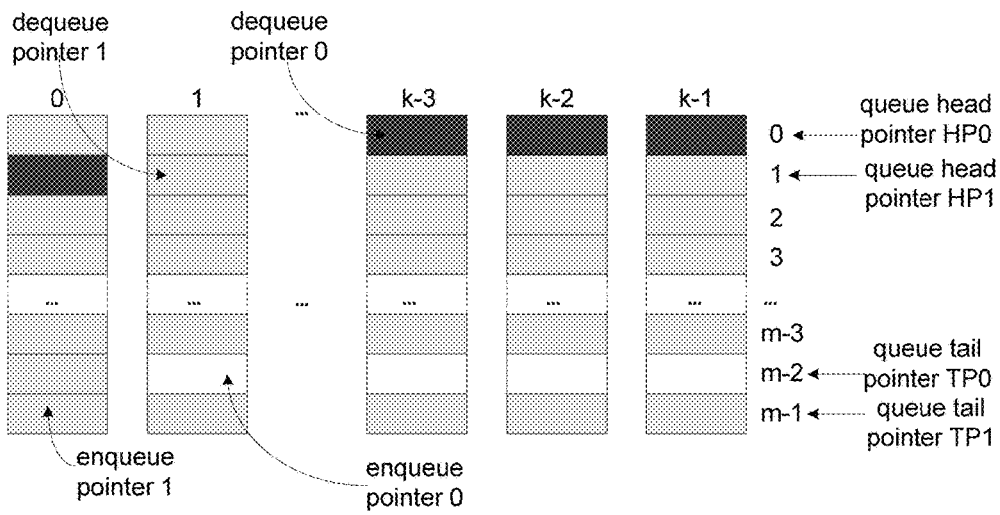
FIG. 4 is a schematic diagram of cell caching of the disclosure.

According to an embodiment, the step 301 includes the following steps. A tail pointer, an enqueue sub-pointer and a free address of an FIFO queue corresponding to the input port number of the cells are acquired based on the input port number. The cells are stored into the FIFO queue, in a length of a number of cache units occupied by each address. Valid cache units occupied by each of the cells are read. When the valid cache units do not occupy the free address, the enqueue sub-pointer of the FIFO queue is updated and the free address is released. When the valid cache units occupied by the cell occupy the free address, the tail pointer and the enqueue sub pointer of the FIFO queue are updated. FIG. 4 is a schematic diagram of cell caching of the disclosure.

The step of storing the cells into the FIFO queue, in a length of a number of cache units occupied by each address, may include the following steps.

When it is determined that the FIFO queue is empty or the cache units of the tail pointer are full, each of the cells is divided, from a high bit to a low bit, into the M groups of data. Each group of the data has a bit width same as a bit width of the cache unit. The M groups of the data are written into the FIFO queue from a high bit to a low bit.

When it is determined that the FIFO queue is not empty or the cache units of the tail pointer are not full, each of the cells is divided, from a high bit to a low bit, into the M groups of the division data. Each group of the division data has a bit width same as a bit width of the cache unit. The M groups of the division data are written from a high bit to a low bit into the FIFO queue from a position to which the enqueue sub-pointer points. One of the groups of the division data containing the highest bit of the cell is written into a cache unit of the enqueue sub-pointer. A last one of the groups of the division data of the cell is written into a cache unit of the free address with a cache unit number being equal to the enqueue sub-pointer number minus one.

Herein, the M is equal to a number of cache units contained in one address, i.e., M=N; and the M is a positive integer.

Valid cache units occupied by the cell are cache units actually occupied by the cell.

The valid cache units not occupying the free address means that, a sum of the number of the cache units actually occupied by the cell and the enqueue sub-pointer is not more than M, and the enqueue sub-pointer is not zero.

The valid cache units occupied by the cell occupying the free address means that, a sum of the number of the cache units actually occupied by the cell and the enqueue sub-pointer is more than M.

When the number of the cache units actually occupied by the cell is smaller than M, the last one of the groups of the division data of the cell is invalid.

In step 302, in a current Kth cycle, a cell waiting for dequeue is scheduled to be dequeued, when it is determined that the cell waiting for dequeue can be dequeued. An actual number of concatenation units occupied by the cell waiting for dequeue is acquired. The cell waiting for dequeue is stored into a register with a bit width same as a bit width of a bus, through cell concatenation.

Herein, a bit width of the concatenation unit is (1/X)*a bit width of the cache unit, and may be set based on, for example, a data forwarding rate. It should be guaranteed that there is no data loss in case of the smallest number of registers, and meanwhile, it should be guaranteed that bus resources are made full use of to avoid an empty beat. X is a positive integer.

It is determined that the cell waiting for dequeue can be dequeued when a first back pressure count value in a (K−1)th cycle is less than or equal to a first preset threshold, and the first back pressure count value in the (K−1)th cycle is calculated based on an estimate value of a number of concatenation units occupied by a previous dequeued cell, a number of the concatenation units transmittable by the bus per cycle, and the first back pressure count value in a (K−2)th cycle, the K is an positive integer.

The first back pressure count value is adapted to judge whether a cell waiting for dequeue in the queue is allowed to be dequeued.

> The first back pressure count value in the (K−1) cycle=(the first back pressure count value in a (K−2)th cycle)+(the estimate value of the number of concatenation units occupied by a previous dequeued cell)−(the number of the concatenation units transmittable by the bus per cycle).

The estimate value of a number of concatenation units occupied by a previous dequeued cell=a product of (a number of cache units occupied by the previous dequeued cell) and the X.

When K=1, i.e., when a first cell waiting for dequeue in the FIFO queue is dequeued, the first back pressure count value is zero due to that there is no a cell waiting for dequeue before the first cell, and the dequeueing and a subsequent operation on the first cell waiting for dequeue may be performed directly.

When K=2, i.e., when the first cell waiting for dequeue in the FIFO queue has been dequeued, the first back pressure count value in the (K−2)th cycle is zero due to that there are no other cells dequeued before the first cell waiting for dequeue is dequeued. Therefore, the first back pressure count value in the first cycle can be directly acquired based on the estimation value of the concatenation units occupied by the first cell waiting for dequeue and the number of the concatenation units transmittable by the bus per cycle, and whether a next cell waiting for dequeue is allowed to be dequeued based on the first back pressure count value in the first cycle.

According to an embodiment, when the first back pressure count value in (K−1)th cycle is greater than a first preset threshold, a cell waiting for dequeue in the queue is not allowed to be dequeue in the Kth cycle. The data in the register may be transmitted based on the number of concatenation units transmittable by the bus per cycle, until the first back pressure count value in the Gth cycle is smaller than or equal to the first preset threshold, and then it is determined that in a (G+1) cycle the cell waiting for dequeue can be dequeued. The G is a positive integer greater than K.

According to an embodiment, the step of scheduling the cell waiting for dequeue to be dequeued may include the following steps. A head pointer, a sub-head pointer and a dequeue sub-pointer of a corresponding FIFO queue are acquired based on a dequeue port number. A cache unit number range and number of cache units to be read may be calculated based on a number of the cache units occupied by the cell waiting for dequeue in the queue and the dequeue sub-pointer. Then data in the cache units occupied by the cell waiting for dequeue is recombined into one cell, and the dequeue sub-pointer is updated to be a sum of a previous dequeue sub-pointer and the number of the cache units occupied by the cell. When the sum is greater than N, the dequeue sub-pointer is updated to be the sum minus N. When the sum of the previous dequeue sub-pointer and the number of the cache units occupied by the cell is not greater than N, the head pointer will not be updated. When the sum of the dequeue sub-pointer and the number of the cache units occupied by the cell is greater than N, the head pointer is updated to be the sub-head pointer. The cell waiting for dequeue is a first cell in the FIFO queue.

Herein, the dequeue port number is same as the input port number.

According to an embodiment, after the cell waiting for dequeue is scheduled to be dequeued, the method may further include the following steps. The first back pressure count value is corrected based on an actual value of a number of the concatenation units occupied by the cell waiting for dequeue. Herein, since the actual value of the number of the concatenation units occupied by the cell waiting for dequeue is generally smaller than the estimation value of the number of the concatenation units occupied by the cell waiting for dequeue, when the actual value is different from the estimation value, the first back pressure count value is corrected by subtracting, from the first back pressure count value, a difference between the estimation value and the actual value. Then the corrected first back pressure count value is compared with the first preset threshold to judge whether a cell waiting for dequeue is allowed to be dequeued in a next cycle.

According to an embodiment, a register group formed of two or more registers may be provided.

Each of the registers contains Y virtual units. That is, the register is divided into the Y virtual units. Each of the virtual units has a bit width same as a bit width of the concatenation unit.

The step of storing the cell waiting for dequeue through the cell concatenation into the register with the bit width as same as the bit width of the bus may include the following steps.

Figure 5:
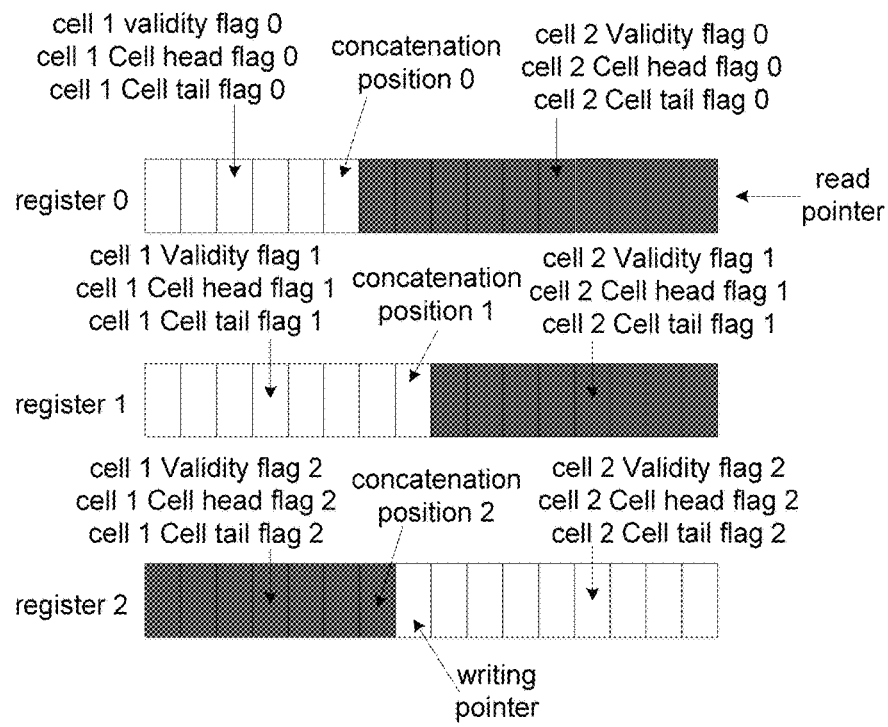
FIG. 5 is a schematic diagram of cell concatenation of the disclosure.

A write pointer of the register group is acquired, and the cell waiting for dequeue is stored into a register corresponding to the write pointer based on the actual number of the concatenation units occupied by the cell. When the register contains one or more valid cells, the cell waiting for dequeue is concatenated, with the one or more valid cells into concatenation units. Cell concatenation information is recorded. The write pointer is updated to have a value equal to a sum of the number of the concatenation units occupied by the cell waiting for dequeue and a previous value of the write pointer. When the sum is greater than or equal to Y, a new value of the write pointer is set to be the sum minus Y. The write pointer is moved in a step value of a concatenation unit. FIG. 5 is a schematic diagram of cell concatenation of the disclosure.

Herein, the cell concatenation information may include: a concatenation position, a cell head flag, a cell tail flag and a cell validity flag. The concatenation position identifies a boundary between two cells.

According configuration of the register of the embodiment of the disclosure, at most two cells can be concatenated. Therefore, the cell validity flag includes a first cell validity flag and a second cell validity flag. When a second cell has yet not been input to the register, and virtual units contained in the register are not full, the second cell validity flag is invalid.

According to an embodiment, when the registers of the register group contains valid cell data, all of the data carrying the cell concatenation information in a register of the register group corresponding to a read pointer is output to the cell cache output end. As shown in FIG. 5, the read pointer is changed in units of the registers. After the data in a register 0 is output, the read pointer points to a register 1.

Figure 6:
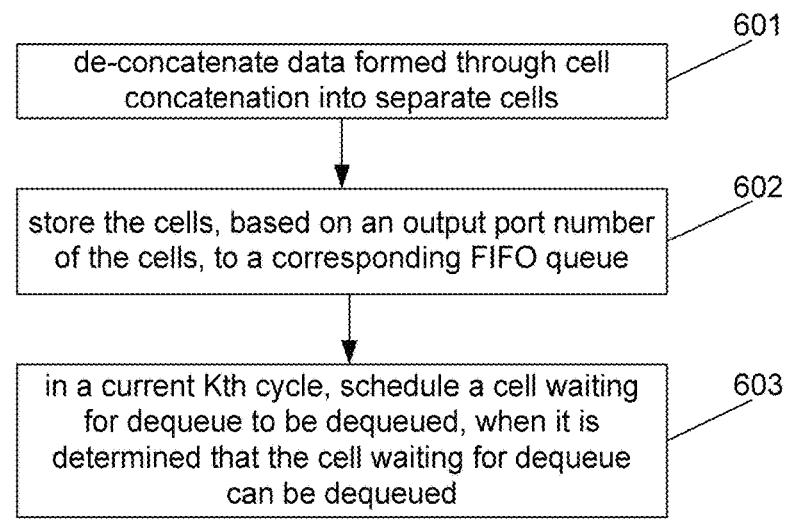
FIG. 6 is a schematic diagram of a data caching method according to a second embodiment of the disclosure.

FIG. 6 is a schematic diagram of a data caching method according to a second embodiment of the disclosure. As shown in FIG. 6, at the cell cache output end, the data caching method according to the embodiment includes the following steps.

In step 601, data formed through cell concatenation is de-concatenated into separate cells.

Herein, when the data in the registers is output, the data formed through cell concatenation is firstly de-concatenated into the separate cells.

This step may further include the following step. The data formed through cell concatenation, is de-concatenated into separate cells, based on cell concatenation information carried in the data.

The cell concatenation information may include: the concatenation position, the cell head flag, the cell tail flag and the cell validity flag. The concatenation position identifies a boundary between two cells.

In step 602, the cells are stored to a corresponding FIFO queue based on an output port number of the cells.

Before the step 602, the method may further include the following steps. A cell length and a cell version carried in each of the cells are extracted; and a number of cache units occupied by the cell are acquired based on the cell length and the cell version.

Herein, each of the cache units is (1/N)*an RAM corresponding to each address. That is, the RAM is divided into N parts of a same size. Each of the parts is one cache unit, N is a positive integer and N may be set depending on, for example, a data forwarding rate.

In additional to the step of storing, based on the output port number of the cells, the cells to the corresponding FIFO queue, the method may further include the following step. Cell information of the cells is stored into the corresponding FIFO queue. The cell information of each of the cells may include a length of the cell, a version of the cell and the number of cache units occupied by the cell.

According to an embodiment, this step includes the following steps. A tail pointer, an enqueue sub-pointer and a free address of an FIFO queue corresponding to the output port number of the cells are acquired based on the out port number. The cells are stored into the FIFO queue, in a length of a number of cache units occupied by each address. Valid cache units occupied by each of the cells are read. When the valid cache units do not occupy the free address, the enqueue sub-pointer of the FIFO queue is updated and the free address is released. When the valid cache units occupied by the cell occupy the free address, the tail pointer and the enqueue sub pointer of the FIFO queue are updated.

The step of storing the cells into the FIFO queue, in a length of a number of cache units occupied by each address, may include the following steps.

When it is determined that the FIFO queue is empty or the cache units of the tail pointer are full, each of the cell is divided, from a high bit to a low bit, into the M groups of the division data. Each group of the division data has a bit width same as a bit width of the cache unit. The M groups of the division data are written into the FIFO queue from a high bit to a low bit.

When it is determined that the FIFO queue is not empty or the cache units of the tail pointer are not full, each of the cell is divided, from a high bit to a low bit, into the M groups of the division data. Each group of the division data has a bit width same as a bit width of the cache unit. The M groups of the division data are written from a high bit to a low bit into the FIFO queue from a position to which the enqueue sub-pointer points. One of the groups of the division data containing the highest bit of the cell is written into a cache unit of the enqueue sub-pointer. A last one of the groups of the division data of the cell is written into a cache unit of the free address with a cache unit number being equal to the enqueue sub-pointer number minus one.

Herein, the M is equal to a number of cache units contained in one address, i.e., M=N; and the M is a positive integer.

Valid cache units occupied by the cell are cache units actually occupied by the cell.

The valid cache units not occupying the free address means that, a sum of the number of the cache units actually occupied by the cell and the enqueue sub-pointer is not more than M, and the enqueue sub-pointer is not zero.

The valid cache units occupied by the cell occupying the free address means that, a sum of the number of the cache units actually occupied by the cell and the enqueue sub-pointer is more than M.

When the number of the cache units actually occupied by the cell is smaller than M, the last one of the groups of the division data of the cell is invalid.

In step 603, in a current Kth cycle, a cell waiting for dequeue is scheduled to be dequeued, when it is determined that the cell waiting for dequeue can be dequeued.

Herein, It is determined that the cell waiting for dequeue can be dequeued when a second back pressure count value in a (K−1)th cycle is less than or equal to a second preset threshold, and the second back pressure count value in the (K−1)th cycle is calculated based on an estimate value of a number of concatenation units occupied by a previous dequeued cell, a number of the concatenation units transmittable by the bus per cycle, and the second back pressure count value in a (K−2)th cycle, the K is an positive integer.

A bit width of the concatenation unit is (1/X)*a bit width of the cache unit, and may be set based on, for example, a data forwarding rate. It should be guaranteed that there is no data loss in case of the smallest number of registers, and meanwhile, it should be guaranteed that bus resources are made full use of to avoid an empty beat. X is a positive integer.

The second back pressure count value is adapted to judge whether a cell waiting for dequeue in the queue is allowed to be dequeued.

The second back pressure count value in the (K−1) cycle=(the second back pressure count value in a (K−2)th cycle)+(the estimate value of the number of concatenation units occupied by a previous dequeued cell)−(the number of the concatenation units transmittable by the bus per cycle).

The estimate value of a number of concatenation units occupied by a previous dequeued cell=a product of (a number of cache units occupied by the previous dequeued cell) and the X.

When K=1, i.e., when a first cell waiting for dequeue in the FIFO queue is dequeued, the second back pressure count value is zero due to that there is no a cell waiting for dequeue before the first cell, and the dequeueing and a subsequent operation on the first cell waiting for dequeue may be performed directly.

When K=2, i.e., when the first cell waiting for dequeue in the FIFO queue has been dequeued, the second back pressure count value in the (K−2)th cycle is zero due to that there are no other cells dequeued before the first cell waiting for dequeue is dequeued. Therefore, the second back pressure count value in the first cycle can be directly acquired based on the estimation value of the concatenation units occupied by the first cell waiting for dequeue and the number of the concatenation units transmittable by the bus per cycle, and whether a next cell waiting for dequeue is allowed to be dequeued based on the second back pressure count value in the first cycle.

According to an embodiment, when the second back pressure count value in (K−1)th cycle is greater than a second preset threshold, a cell waiting for dequeue in the queue is not allowed to be dequeue in the Kth cycle. The data in the register may be transmitted based the number of concatenation units transmittable by the bus per cycle, until the second back pressure count value in the Gth cycle is smaller than or equal to the second preset threshold, and then it is determined that in a (G+1) cycle the cell waiting for dequeue can be dequeued. The G is a positive integer greater than K.

According to an embodiment, the step of scheduling the cell waiting for dequeue to be dequeued may include the following steps. A head pointer, a sub-head pointer and a dequeue sub-pointer of a corresponding FIFO queue are acquired based on a dequeue port number. A cache unit number range and number of cache units to be read may be calculated based on a number of the cache units occupied by the cell waiting for dequeue in the queue and the dequeue sub-pointe. Then data in the cache units occupied by the cell waiting for dequeue is recombined into one cell, and the dequeue sub-pointer is updated to be a sum of a previous dequeue sub-pointer and the number of the cache units occupied by the cell. When the sum is greater than N, the dequeue sub-pointer is updated to be the sum minus N. When the sum of the previous dequeue sub-pointer and the number of the cache units occupied by the cell is not greater than N, the head pointer will not be updated. When the sum of the dequeue sub-pointer and the number of the cache units occupied by the cell is greater than N, the head pointer is updated to be the sub-head pointer. The cell waiting for dequeue is the first cell in the FIFO queue.

Herein, the dequeue port number is same as the output port number.

According to an embodiment, after the cell waiting for dequeue is scheduled to be dequeued, the method may further include the following step. The second back pressure count value is corrected based on an actual value of a number of the concatenation units occupied by a cell waiting for dequeue. Herein, since the actual value of the number of the concatenation units occupied by the cell waiting for dequeue is generally smaller than the estimation value of the number of the concatenation units occupied by the cell waiting for dequeue, when the actual value is different from the estimation value, the second back pressure count value is corrected by subtracting, from the second back pressure count value, a difference between the estimation value and the actual value. Then the corrected second back pressure count value is compared with the second preset threshold to judge whether a cell waiting for dequeue is allowed to be dequeued in a next cycle.

Figure 7:
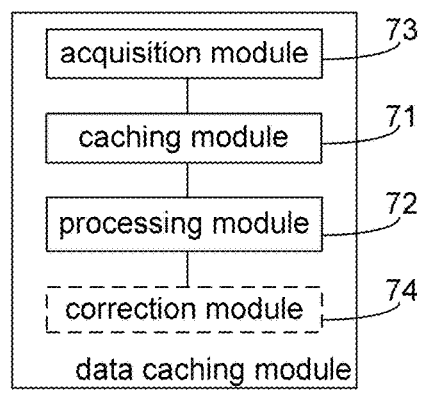
FIG. 7 is a block diagram of a data caching device according to the first embodiment of the disclosure.

FIG. 7 is a block diagram of a data caching device according to the first embodiment of the disclosure. As shown in FIG. 7, the device includes a caching module 71 and a processing module 72.

The caching module 71 is arranged to store cells, based on an input port number of the cells, to a corresponding FIFO queue.

The processing module 72 is arranged to: in a current Kth cycle, schedule a cell waiting for dequeue to be dequeued, when it is determined that the cell waiting for dequeue can be dequeued; acquire an actual value of a number of concatenation units occupied by the cell waiting for dequeue; and store the cell waiting for dequeue, through cell concatenation, into a register with a bit width same as a bit width of a bus.

When a first back pressure count value in a (K−1)th cycle is less than or equal to a first preset threshold, it is determined that the cell waiting for dequeue can be dequeued. The first back pressure count value in the (K−1)th cycle is calculated based on an estimate value of a number of concatenation units occupied by a previous dequeued cell, a number of the concatenation units transmittable by the bus per cycle, and the first back pressure count value in a (K−2)th cycle, where the K is an positive integer.

Each of the cache units has a size that is N times smaller than that of an RAM corresponding to each address. That is, the RAM is equally divided into N parts. Each of the parts is one cache unit, N is a positive integer and may be set depending on, for example, a data forwarding rate.

A bit width of the concatenation unit is X times smaller than a bit width of the cache unit, and may be set based on, for example, a data forwarding rate. It should be guaranteed that there is no data loss in case of the smallest number of registers and that bus resources are fully used without an empty beat. X is a positive integer.

According to an embodiment, the device may further include an acquisition module 73. The acquisition module 73 is arranged to extract a cell length and a cell version carried in each of the cells; and acquire a number of cache units occupied by the cell based on the cell length and the cell version.

Correspondingly, the caching module 71 is arranged to store cell information of the cell into the corresponding FIFO queue. The cell information includes the cell length, the cell version and the number of cache units occupied by the cell.

According to an embodiment, as regards to that the caching module 71 is arranged to store cells, based on the input port number of the cells, to the corresponding FIFO queue, the caching module 71 may be arranged to: acquire a tail pointer, an enqueue sub-pointer and a free address of an FIFO queue corresponding to the input port number of the cells based on the input port number; store the cells into the FIFO queue, in a length of a number of cache units occupied by each address; and read valid cache units occupied by each of the cells. When the valid cache units do not occupy the free address, the enqueue sub-pointer of the FIFO queue is updated and the free address is released. When the valid cache units occupied by the cell occupy the free address, the tail pointer and the enqueue sub pointer of the FIFO queue are updated.

As regards to that the caching module 71 is arranged to store the cells into the FIFO queue, in a length of a number of cache units occupied by each address, the caching 71 may be arranged to: when it is determined that the FIFO queue is empty or the cache units of the tail pointer are full, divide each of the cell, from a high bit to a low bit, into the M groups of the division data, each of the groups of the division data having a bit width same as a bit width of the cache unit; write the M groups of the division data into the FIFO queue from a high bit to a low bit; when it is determined that the FIFO queue is not empty or the cache units of the tail pointer are not full, divide each of the cell, from a high bit to a low bit, into M groups of the division data, each of the groups of the division data having a bit width same as a bit width of the cache unit; write the M groups of the division data from a high bit to a low bit into the FIFO queue from a position to which the enqueue sub-pointer points. One of the groups of the division data containing the highest bit of the cell is written into a cache unit of the enqueue sub-pointer; and a last one of the groups of the division data of the cell is written into a cache unit of the free address with a cache unit number being equal to the enqueue sub-pointer number minus one.

Herein, the M is equal to a number of cache units contained in one address, i.e., M=N; and the M is a positive integer.

Valid cache units occupied by the cell are cache units actually occupied by the cell.

The valid cache units not occupying the free address means that, a sum of the number of the cache units actually occupied by the cell and the enqueue sub-pointer is not more than M, and the enqueue sub-pointer is not zero.

The valid cache units occupied by the cell occupying the free address means that, a sum of the number of the cache units actually occupied by the cell and the enqueue sub-pointer is more than M.

When the number of the cache units actually occupied by the cell is smaller than M, the last one of the groups of the division data of the cell is invalid.

According to an embodiment, the first back pressure count value in the (k−1)th cycle is adapted to judge whether a cell waiting for dequeue in the queue is allowed to be dequeued in the kth cycle.

The first back pressure count value in the (K−1) cycle is equal to the first back pressure count value in a (K−2)th cycle plus the estimate value of the number of concatenation units occupied by a previous dequeued cell minus the number of the concatenation units transmittable by the bus per cycle.

The estimate value of a number of concatenation units occupied by a previous dequeued cell is equal to a product of a number of cache units occupied by the previous dequeued cell and and the X.

When K=1, i.e., when a first cell waiting for dequeue in the FIFO queue is dequeued, the first back pressure count value is zero due to that there is no a cell waiting for dequeue before the first cell, and the dequeue operation on the first cell waiting for dequeue and a subsequent operation may be performed directly.

When K=2, i.e., when the first cell waiting for dequeue in the FIFO queue has been dequeued, the first back pressure count value in the (K−2)th cycle is zero due to that there are no other cells dequeued before the first cell waiting for dequeue is dequeued. Therefore, the first back pressure count value in the first cycle can be directly acquired based on the estimation value of the concatenation units occupied by the first cell waiting for dequeue and the number of the concatenation units transmittable by the bus per cycle, and whether a next cell waiting for dequeue is allowed to be dequeued based on the first back pressure count value in the first cycle.

According to an embodiment, the processing module 72 may be further arranged to: not allow a cell waiting for dequeue in the queue to be dequeue in the Kth cycle when the first back pressure count value in a (K−1)th cycle is greater than a first preset threshold. The data in the register is transmitted based the number of concatenation units transmittable by the bus per cycle, until the first back pressure count value in the Gth cycle is smaller than or equal to the first preset threshold, and then it is determined that in a (G+1) cycle the cell waiting for dequeue can be dequeued, where the G is a positive integer greater than K.

According to an embodiment, as regards to that the processing module 72 is arranged to schedule the cell waiting for dequeue to be dequeued, the processing module 72 may be arranged to acquire a head pointer, a sub-head pointer and a dequeue sub-pointer of a corresponding FIFO queue based on a dequeue port number; calculate a cache unit number range and number of cache units to be read based on a number of the cache units occupied by the cell waiting for dequeue in the queue and the dequeue sub-pointer of the queue; recombine the data in the cache units occupied by the cell waiting for dequeue into one cell; update the dequeue sub-pointer to be a sum of a previous dequeue sub-pointer and the number of the cache units occupied by the cell. When the sum is greater than N, the dequeue sub-pointer is updated to be the sum minus N. When the sum of the previous dequeue sub-pointer and the number of the cache units occupied by the cell is not greater than N, the head pointer is not updated. When the sum of the dequeue sub-pointer and the number of the cache units occupied by the cell is greater than N, the head pointer is updated to be the sub-head pointer. The cell waiting for dequeue is the first cell in the FIFO queue.

Herein, the dequeue port number is as same as the input port number.

According to an embodiment, the device further includes a correction module 74. The correction module 74 is arranged to correct the first back pressure count value based on an actual value of a number of the concatenation units occupied by a cell waiting for dequeue.

Herein, since the actual value of the number of the concatenation units occupied by the cell waiting for dequeue is generally smaller than the estimation value of the number of the concatenation units occupied by the cell waiting for dequeue, when the actual value is different from the estimation value, the first back pressure count value is corrected by subtracting, from the first back pressure count value, a difference between the estimation value and the actual value. Then the corrected first back pressure count value is compared with the first preset threshold to judge whether a cell waiting for dequeue is allowed to be dequeued in a next cycle.

According to an embodiment, a register group formed of two or more registers may be provided.

Each of the registers contains Y virtual units. That is, the register is divided into the Y virtual units. Each of the virtual units has a bit width as same as a bit width of the concatenation unit.

As regards to that the processing module 72 is arranged to store the cell waiting for dequeue through the cell concatenation into the register with the bit width as same as the bit width of the bus, the processing module 72 may be arranged to: acquire a write pointer of the register group, and store the cell waiting for dequeue into a register corresponding to the write pointer based on the actual number of the concatenation units occupied by the cell; when the register contains one or more valid cells, concatenate the cell waiting for dequeue, with the one or more valid cells into concatenation units; record cell concatenation information; update the write pointer to be a value equal to a sum of the number of the concatenation units occupied by the cell waiting for dequeue and a previous value of the write pointer. When the sum is greater than or equal to Y, the write pointer is set to be the sum minus Y. The write pointer is moved based on a step value of a concatenation unit.

Herein, the cell concatenation information may include: a concatenation position, a cell head flag, a cell tail flag and a cell validity flag. The concatenation position identifies a boundary between two cells.

In the embodiment of the disclosure, at most two cells can be concatenated according to the configuration of the register. Therefore, the cell validity flag includes a first cell validity flag and a second cell validity flag. When a second cell has not yet been input to the register, and virtual units contained in the register are not full, the second cell validity flag is invalid.

According to an embodiment, the processing module 72 may be further arranged to: when the registers of the register group contains valid cell data, output all of the data carrying the cell concatenation information in a register of the register group corresponding to a read pointer to the cell cache output. As shown in FIG. 5, the read pointer is changed in units of registers. After the data in register 0 is output, the read pointer points to register 1.

Figure 8:
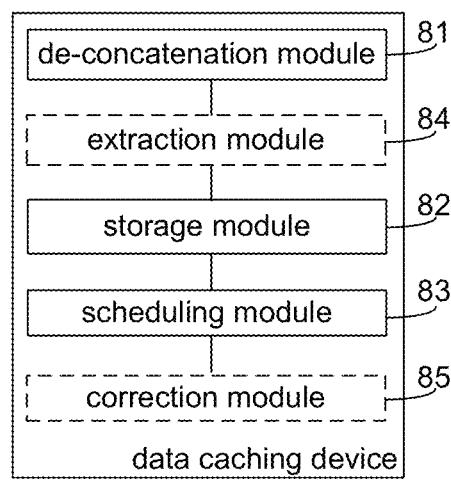
FIG. 8 is a block diagram of a data caching device according to the second embodiment of the disclosure.

FIG. 8 is a schematic constituent structure diagram of a data caching device according to the second embodiment of the disclosure. As shown in FIG. 8, the device includes a de-concatenation module 81, a storage module 82 and a scheduling module 83.

The de-concatenation module 81 is arranged to de-concatenate data formed through cell concatenation into separate cells.

The storage module 82 is arranged to store the cells, based on an output port number of the cells, to a corresponding First-In-First-Out (FIFO) queue.

The scheduling module 83 is arranged to in a current Kth cycle, schedule the cells waiting for dequeue to be dequeued, when it is determined that the cells waiting for dequeue can be dequeued.

It is determined that the cells waiting for dequeue can be dequeued when a second back pressure count value in a (K−1)th cycle is less than or equal to a second preset threshold. The second back pressure count value in the (K−1)th cycle is calculated based on an estimate value of a number of concatenation units occupied by a previous dequeued cell, a number of the concatenation units transmittable by the bus per cycle, and the second back pressure count value in a (K−2)th cycle, the K is an positive integer.

According to an embodiment, as regards to that the de-concatenation module 81 is arranged to de-concatenate data formed through cell concatenation into separate cells, the de-concatenation module 81 may be arranged to de-concatenate, based on cell concatenation information carried in the data, the data formed through cell concatenation, into separate cells.

The cell concatenation information may include: a concatenation position, a cell head flag, a cell tail flag and a cell validity flag. The concatenation position identifies a boundary between two cells.

According to an embodiment, the device further includes an extraction module 84. The extraction module 84 is arranged to: extract a cell length and a cell version carried in each of the cells; and acquire a number of cache units occupied by the cell based on the cell length and the cell version.

Herein, each of the cache units has a size that is N times smaller than that of an RAM corresponding to each address. That is, the RAM is equally divided into N parts. Each of the parts is one cache unit, N is a positive integer and N may be set depending on, for example, a data forwarding rate.

Correspondingly, the storage module 82 is further arranged to store cell information of the cells into the corresponding FIFO queue. The cell information of each of the cells may include a length of the cell, a version of the cell and the number of cache units occupied by the cell.

According to an embodiment, in order to store the cells, based on the output port number of the cells, to the corresponding FIFO queue, the storage module 82 may be arranged to: acquire a tail pointer, an enqueue sub-pointer and a free address of an FIFO queue corresponding to the output port number of the cells based on the output port number, store the cells into the FIFO queue, in a length of a number of cache units occupied by each address and read valid cache units occupied by each of the cells; when the valid cache units do not occupy the free address, update the enqueue sub-pointer of the FIFO queue and release the free address; and when the valid cache units occupied by the cell occupy the free address, update the tail pointer and the enqueue sub pointer of the FIFO queue.

In order to store the cells into the FIFO queue, in a length of a number of cache units occupied by each address, the storage module 82 may be arranged to perform the following.

When determining that the FIFO queue is empty or the cache units of the tail pointer are full, the storage module 82 divides each of the cells, from a high bit to a low bit, into M groups of the division data, each group of the division data having a bit width same as a bit width of the cache unit, and writes the M groups of the division data into the free address from a high bit to a low bit.

When determining that the FIFO queue is not empty or the cache units of the tail pointer are not full, the storage module 82 divides each of the cells, from a high bit to a low bit, into M groups of the division data, each group of the division data having a bit width same as a bit width of the cache unit, and writes the M groups of the division data from a high bit to a low bit from a position to which the enqueue sub-pointer points. One of the groups of the division data containing the highest bit of the cell is written into a cache unit of the enqueue sub-pointer. The last group of the division data of the cell is written into a cache unit of the free address with a reference number being equal to the enqueue sub-pointer number minus one.

Herein, the M is a number of cache units contained in one address, i.e., M=N; and the M is a positive integer.

Valid cache units occupied by the cell are cache units actually occupied by the cell.

The valid cache units not occupying the free address means that, a sum of the number of the cache units actually occupied by the cell and the enqueue sub-pointer is not more than M, and the enqueue sub-pointer is not zero.

The valid cache units occupied by the cell occupying the free address means that, a sum of the number of the cache units actually occupied by the cell and the enqueue sub-pointer is more than M.

When the number of the cache units actually occupied by the cell is smaller than M, the last group of the division data of the cell is invalid.

According to an embodiment, a bit width of the concatenation unit is (1/X)*a bit width of the cache unit, and may be set based on, for example, a data forwarding rate. It should be guaranteed that there is no data loss in case of the smallest number of registers, and bus resources are fully used without an empty beat. X is a positive integer.

The second back pressure count value is employed to judge whether a cell waiting for dequeue in the queue is allowed to be dequeued.

The second back pressure count value in the (K−1) cycle is equal to the second back pressure count value in a (K−2)th cycle plus the estimate value of the number of concatenation units occupied by a previous dequeued cell minus the number of the concatenation units transmittable by the bus per cycle.

The estimate value of a number of concatenation units occupied by a previous dequeued cell is equal to a product of a number of cache units occupied by the previous dequeued cell and the X.

When K=1, i.e., when a first cell waiting for dequeue in the FIFO queue is dequeued, since there is no cell waiting for dequeue before the first cell, the second back pressure count value is zero and the dequeue operation on the first cell waiting for dequeue and subsequent operations may be performed directly.

When K=2, i.e., when the first cell waiting for dequeue in the FIFO queue has been dequeued, since there are no other cells dequeued before the first cell waiting for dequeue is dequeued, the second back pressure count value in the (K−2)th cycle is zero. Therefore, the second back pressure count value in the first cycle can be directly acquired based on the estimation value of the concatenation units occupied by the first cell waiting for dequeue and the number of the concatenation units transmittable by the bus per cycle, and whether a next cell waiting for dequeue is allowed to be dequeued based on the second back pressure count value in the first cycle.

According to an embodiment, the scheduling module 83 may be further arranged to: when the second back pressure count value in (K−1)th cycle is greater than a second preset threshold, not allow a cell waiting for dequeue in the queue to be dequeued in the Kth cycle; transmit the data in the register based on the number of concatenation units transmittable by the bus per cycle; when the second back pressure count value in the Gth cycle is smaller than or equal to the second preset threshold, determine that in a (G+1) cycle the cell waiting for dequeue can be dequeued. The G is a positive integer greater than K.

According to an embodiment, in order to schedule the cell waiting for dequeue to be dequeued, the scheduling module 83 may be arranged to, acquire a head pointer, a sub-head pointer and a dequeue sub-pointer of a corresponding FIFO queue based on a dequeue port number, calculate a range of reference numbers of the cache units and a number of cache units to be read based on a number of the cache units occupied by the cell waiting for dequeue in the queue and the dequeue sub-pointer of the queue, then recombine data in the cache units occupied by the cell waiting for dequeue into one cell and transfer the cell to the bus, and update the dequeue sub-pointer to be a sum of a previous dequeue sub-pointer and the number of the cache units occupied by the cell. When the sum is greater than N, the dequeue sub-pointer is updated to be the sum minus N. When the sum of the previous dequeue sub-pointer and the number of the cache units occupied by the cell is not greater than N, the head pointer will not be updated. When the sum of the dequeue sub-pointer and the number of the cache units occupied by the cell is greater than N, the head pointer is updated to be the sub-head pointer. The cell waiting for dequeue is the first cell in the FIFO queue.

Herein, the dequeue port number is same as the output port number.

According to an embodiment, the device may further include a correction module 85. The correction module 85 is arranged to perform the following steps. After the cell waiting for dequeue is scheduled to be dequeued, the second back pressure count value is corrected based on an actual value of a number of the concatenation units occupied by a cell waiting for dequeue. Herein, since the actual value of the number of the concatenation units occupied by the cell waiting for dequeue is generally smaller than the estimation value of the number of the concatenation units occupied by the cell waiting for dequeue, when the actual value is different from the estimation value, the second back pressure count value is corrected by subtracting, from the second back pressure count value, a difference between the estimation value and the actual value. Then the corrected second back pressure count value is compared with the second preset threshold to judge whether a cell waiting for dequeue is allowed to be dequeued in a next cycle.

The caching module, the processing module, the acquisition module, the correction module, the de-concatenation module, the storage module, the scheduling module, the extraction module and the correction module in the data caching device according to the embodiment of the disclosure may be implemented via a processor, or of course, may be implemented by a specific logical circuit. The processor may be a processor in a mobile terminal or a server. In practice, the processor may be a Central Processing Unit (CPU), a Micro-Processor Unit (MPU), a Digital Signal Processor (DSP), a Field Programmable Gate Array (FPGA) or the like.

According to the embodiment of the disclosure, the data caching method, when implemented in a form of a software functional module and sold or used as a standalone product, may be stored in a readable storage medium. In view of this, essence or the contribution to the related art of the technical solutions of the embodiments of the disclosure may be embodied in a software product. The software product is stored in a storage medium and includes several instructions which cause a computer device (may be a personal computer, a server, a network device or the like) to perform some or all of the method according to an embodiment of the disclosure. The storage medium may include an USB driver, a removable hard disk, a Read-Only Memory (ROM), a magnetic disk or an optical disk or other mediums which can store program codes. Therefore, the embodiment of the disclosure is not limited to any specific combination of software and hardware.

Correspondingly, the embodiment of the disclosure may further provide a readable storage medium storing executable instructions. The executable instructions are arranged to perform any one of the data caching methods according to the embodiments of the disclosure.

The above embodiments are merely preferred embodiments of the disclosure, and are not intended to limit the protection scope of the disclosure.

What is claimed is:

1. A data caching method, comprising:
    storing cells, based on an input port number of the cells, to a corresponding First-In-First-Out (FIFO) queue; and
    in a current Kth cycle, when it is determined that the cell waiting for dequeue can be dequeued,
        scheduling a cell waiting for dequeue to be dequeued;
        acquiring an actual value of a number of concatenation units occupied by the cell waiting for dequeue; and
        storing the cell waiting for dequeue, through cell concatenation, into a register with a bit width same as a bit width of a bus;
    wherein it is determined that the cell waiting for dequeue can be dequeued when a first back pressure count value in a (K−1)th cycle is less than or equal to a first preset threshold, wherein the first back pressure count value in the (K−1)th cycle is calculated based on an estimate value of a number of concatenation units occupied by a previous dequeued cell, a number of concatenation units transmittable by the bus per cycle, and the first back pressure count value in a (K−2)th cycle, where the K is a positive integer;
    wherein the cells are stored into the FIFO queue by dividing each of the cells into M groups of data.

2. The method according to claim 1, wherein, before the storing the cells, based on the input port number of the cells, to the FIFO queue, the method further comprises:
    extracting a cell length and a cell version carried in each of the cells; and
    acquiring a number of cache units occupied by the cell based on the cell length and the cell version.

3. The method according to claim 1, wherein the storing the cells, based on the input port number of the cells, to the FIFO queue comprises:
    acquiring a tail pointer, an enqueue sub-pointer and a free address of the FIFO queue corresponding to input port number of each of the cells, based on the input port number;
    dividing each of the cells into the M groups of data, and writing the M groups of the data into the FIFO queue;
    reading valid cache units occupied by the cell;
    updating the enqueue sub-pointer of the FIFO queue and releasing the free address, when the valid cache units do not occupy the free address; and
    updating the tail pointer and the enqueue sub-pointer of the FIFO queue, when the valid cache units occupy the free address;
    wherein the valid cache units do not occupy the free address when a sum of a number of the cache units occupied by the cell and the enqueue sub-pointer is not more than M, and the enqueue sub-pointer is not zero.

4. The method according to claim 2, wherein after scheduling the cell waiting for dequeue to be dequeued, the method further comprises:
    correcting the first back pressure count value based on the actual value of the number of the concatenation units occupied by the cell waiting for dequeue and the number of the cache units occupied by the cell waiting for dequeue.

5. The method according to claim 1, wherein the storing the cell waiting for dequeue, through the cell concatenation, into the register with the bit width same as the bit width of the bus comprises:
looking for a write pointer;
storing the cell waiting for dequeue into a register corresponding to the write pointer, based on the actual value of the number of the concatenation units occupied by the cell waiting for dequeue;
when the register contains one or more valid cells, concatenating the cell waiting for dequeue, with the one or more valid cells into concatenation units; and
recording cell concatenation information, and updating the write pointer.

6. A data caching device, comprising:
a processor; and
a memory storing instructions executable by the processor,
wherein the processor is arranged to:
store cells, based on an input port number of the cells, to a corresponding First-In-First-Out (FIFO) queue;
in a current Kth cycle, when it is determined that the cell waiting for dequeue can be dequeued, schedule a cell waiting for dequeue to be dequeued, acquire an actual value of a number of concatenation units occupied by the cell waiting for dequeue, and store the cell waiting for dequeue, through cell concatenation, into a register with a bit width same as a bit width of a bus;
wherein it is determined that the cell waiting for dequeue can be dequeued when a first back pressure count value in a (K−1)th cycle is less than or equal to a first preset threshold, wherein the first back pressure count value in the (K−1)th cycle is calculated based on an estimate value of a number of concatenation units occupied by a previous dequeued cell, a number of the concatenation units transmittable by the bus per cycle, and the first back pressure count value in a (K−2)th cycle, where the K is an positive integer;
wherein the cells are stored into the FIFO queue by dividing each of the cells into M groups of data.

7. The device according to claim 6, wherein the processor is further arranged to extract a cell length and a cell version carried in each of the cells; and acquire a number of cache units occupied by the cell based on the cell length and the cell version.

8. The device according to claim 7, wherein the processor is further arranged to correct the first back pressure count value based on the actual value of the number of the concatenation units occupied by the cell waiting for dequeue and the number of the cache units occupied by the cell waiting for dequeue.

9. A non-transitory computer readable storage medium storing computer-executable instructions for performing a data caching method, comprising:
storing cells, based on an input port number of the cells, to a corresponding First-In-First-Out (FIFO) queue; and
in a current Kth cycle, when it is determined that the cell waiting for dequeue can be dequeued,
scheduling a cell waiting for dequeue to be dequeued;
acquiring an actual value of a number of concatenation units occupied by the cell waiting for dequeue; and
storing the cell waiting for dequeue, through cell concatenation, into a register with a bit width same as a bit width of a bus;
wherein it is determined that the cell waiting for dequeue can be dequeued when a first back pressure count value in a (K−1)th cycle is less than or equal to a first preset threshold, wherein the first back pressure count value in the (K−1)th cycle is calculated based on an estimate value of a number of concatenation units occupied by a previous dequeued cell, a number of concatenation units transmittable by the bus per cycle, and the first back pressure count value in a (K−2)th cycle, where the K is a positive integer;
wherein the cells are stored into the FIFO queue by dividing each of the cells into M groups of data.

10. The non-transitory computer readable storage medium according to claim 9, wherein, before the storing the cells, based on the input port number of the cells, to the FIFO queue, the method further comprises:
extracting a cell length and a cell version carried in each of the cells; and
acquiring a number of cache units occupied by the cell based on the cell length and the cell version.

11. The non-transitory computer readable storage medium according to claim 9, wherein the storing the cells, based on the input port number of the cells, to the FIFO queue comprises:
acquiring a tail pointer, an enqueue sub-pointer and a free address of the FIFO queue corresponding to input port number of each of the cells, based on the input port number;
dividing each of the cells into the M groups of data, and writing the M groups of the data into the FIFO queue;
reading valid cache units occupied by the cell;
updating the enqueue sub-pointer of the FIFO queue and releasing the free address, when the valid cache units do not occupy the free address; and
updating the tail pointer and the enqueue sub-pointer of the FIFO queue, when the valid cache units occupy the free address,
wherein the valid cache units do not occupy the free address when a sum of a number of the cache units occupied by the cell and the enqueue sub-pointer is not more than M, and the enqueue sub-pointer is not zero.

12. The non-transitory computer readable storage medium according to claim 10, wherein after scheduling the cell waiting for dequeue to be dequeued, the method further comprises:
correcting the first back pressure count value based on the actual value of the number of the concatenation units occupied by the cell waiting for dequeue and the number of the cache units occupied by the cell waiting for dequeue.

13. The non-transitory computer readable storage medium according to claim 9, wherein the storing the cell waiting for dequeue, through the cell concatenation, into the register with the bit width same as the bit width of the bus comprises:
looking for a write pointer;
storing the cell waiting for dequeue into a register corresponding to the write pointer, based on the actual value of the number of the concatenation units occupied by the cell waiting for dequeue;
when the register contains one or more valid cells, concatenating the cell waiting for dequeue, with the one or more valid cells into concatenation units; and recording cell concatenation information, and updating the write pointer.

\* \* \* \* \*